(12) United States Patent
Potts

(10) Patent No.: US 7,744,759 B1
(45) Date of Patent: Jun. 29, 2010

(54) MAINTAINING WASTEWATER-TREATMENT SAND FILTERS

(76) Inventor: David A. Potts, 385 Roast Meat Hill Roa, Killingworth, CT (US) 06419

( * ) Notice: Subject to any disclaimer, the term of this patent is extended or adjusted under 35 U.S.C. 154(b) by 0 days.

(21) Appl. No.: 12/511,612

(22) Filed: Jul. 29, 2009

Related U.S. Application Data

(63) Continuation-in-part of application No. 11/025,243, filed on Dec. 29, 2004, now abandoned.

(60) Provisional application No. 60/533,319, filed on Dec. 29, 2003.

(51) Int. Cl.
*C02F 3/00* (2006.01)

(52) U.S. Cl. .................. 210/617; 210/767; 210/150; 210/198.1; 210/263; 210/274; 210/293; 210/406; 210/416.1

(58) Field of Classification Search .................. None
See application file for complete search history.

(56) References Cited

U.S. PATENT DOCUMENTS

| | | | |
|---|---|---|---|
| 4,013,559 A | 3/1977 | Johnson | |
| 4,880,333 A | 11/1989 | Glasser | |
| 5,017,040 A | 5/1991 | Mott | |
| 5,989,416 A | 11/1999 | Gorton | |
| 6,048,131 A | 4/2000 | Laak | |
| 6,659,687 B1 | 12/2003 | Donlin | |
| 7,374,670 B2 | 5/2008 | Potts | |
| 7,465,390 B2 | 12/2008 | Potts | |
| 2005/0284811 A1* | 12/2005 | Potts | 210/617 |

* cited by examiner

*Primary Examiner*—Robert James Popovics
(74) *Attorney, Agent, or Firm*—Michael A. Blake

(57) ABSTRACT

A downflow sand filter used for treating wastewater which has degraded in function from its original design is at least in part rejuvenated by flowing air downwardly through the bed during time when flow of wastewater is ceased. The low velocity air flow helps dewater the bed and leads to the removal of accumulated organic material which has clogged the pores of the bed. In accord with different embodiments, air flow is alternated with water flow in particular ways, for instance, so the water flow is sufficient to create ponding or is sufficient to maintain moisture content within the bed.

18 Claims, 1 Drawing Sheet

MAINTAINING WASTEWATER-TREATMENT SAND FILTERS

CROSS-REFERENCES

This application is a continuation-in-part of patent application Ser. No. 11/025,243 filed Dec. 29, 2004 now abandoned by David A. Potts, entitled "Maintaining Wastewater-Treatment Sand Filters", which application claims the benefit of provisional patent application Ser. No. 60/533,319, filed Dec. 29, 2003 by David A. Potts, entitled "Rejuvenation of Sand Filters", the contents of both which are incorporated by reference herein in their entirety.

TECHNICAL FIELD

The present invention relates to maintaining and rejuvenating particulate medium depth filters, which are used for processing wastewater.

BACKGROUND

Different kinds of particulate medium-containing devices have been long used for treatment of wastewater. They include static bed reactors and fluidized bed reactors. Static bed reactors comprise subsets which include trickling filters and depth filters. The systematics of devices varies in the literature; the term packed bed filters is sometimes used to encompass both types of filters; at other times, the term designates depth filters in distinction to trickling filters. Generally, trickling filters employ large size medium, often comprised of specially shaped ceramic and plastic pieces; and they are designed so that air or other gas can easily flow, usually by convection, around the medium, over which wastewater trickles downwardly.

The present invention is concerned with downflow depth filters, often called sand filters, which as the name connotes, comprise fine particulate medium, e.g., common sand. Insanitary engineering terms, sand is typically defined as having a granular medium having particle size between 0.15 and 2 mm. Since the pores between the sand grains are small, sand filters typically are substantially saturated with water during use, and there is negligible convective air flow within the bed.

Sand filters have been long used for removing suspended solids from, or for clarifying wastewater and other liquids, such as wastewater which flows from a septic tank or other source. Typically, a downflow type sand filter comprises a mass of sand, commonly called the sand bed, which has a depth of two to six feet. Water is sprayed or otherwise distributed upon the surface of the bed on a continuous or intermittent basis, and flows through the bed by force of gravity.

A sand filter may be created within a cavity in the natural earth. Sometimes, the wastewater flows through the sand and directly into underlying soil, in which case the device is sometimes called a bottomless depth filter. Often the medium of the filter bed is contained within a concrete, metal or plastic container, and drains at the bottom of the bed collect the water, so it can be flowed elsewhere. Drains may also be used with filters created within a cavity within the earth. Sand filters vary widely in physical size, in particular in surface area. Small cross section filters may be used for domestic and light industrial wastewater. Large filters may be used in municipal treatment plants.

One aspect of sand filter operation is mechanical: suspended solids in the wastewater fetch up in the interstices of the medium, as the water wends its tortuous downward path. Another anticipated effect is biochemical, wherein, as a result of facultative microbiological decomposition, it is anticipated there will be a reduction in Biological Oxygen Demand (BOD) of the wastewater, conversion of harmful constituents to more benign forms.

According to wastewater engineering principles, effectiveness of sand filters over time is dependent on proper design and operation. Generally, the biochemistry, volume and frequency of dosing of the inflowing wastewater must correlate with the size and other characteristics of the filter. Frequent maintenance, commonly backwashing, is called for. How such principles are adhered to in practice is always a question. It is known that conventional sand filter beds often present operational problems. A major problem is that a filter becomes clogged or "sluggish" with respect to through-flow of wastewater. That is, the filter tends to progressively becomes less accepting of the design-intended wastewater flow; the apparent hydraulic conductivity is decreased. The water head loss through the filter increases, and by and by a pond of water will appear on the top surface of the bed, even though inflow has not been changed. Ultimately, if no remedial action is taken, the system performance degrades to the point that the system fails to fulfill its intended purpose.

Clogging and associated ponding are normally attributed to an accumulation of solids upon the bed and within the interstices of the bed. Frequently, a layer or mat of foreign matter may be observed on the sand bed surface. Of course, that is not surprising since the bed surface might be expected to act as a primary mechanical strainer of suspended solids. Once a mat starts to form, there is an accelerating trend toward failure.

Various techniques are commonly used to avoid or counter the foregoing kinds of degradation. In one common approach, the bed is backwashed with up-flowing water, sometimes abetted with an upward air scour. The idea of backwashing is to disrupt the medium, so that clogging matter is carried away with the backwash water. In another remedial action, the bed surface is mechanically raked to disrupt the mat. However, raking requires good access to the bed surface, can be distasteful for a worker, and the process can allow portions of the mat to move deeper within the bed. In another approach, the top layer of the medium, or the whole of the medium, can be replaced. While these alternative maintenance activities can be effective, it is found that they often need to be done frequently, can be temporarily disruptive to continued wastewater processing, may not be wholly, effective, or may be costly. Thus, improvements are sought.

SUMMARY OF THE INVENTION

An object of the invention is to improve the method of rejuvenating and maintenance of depth filters which have become deficient in performance. Another object of the invention is to slow a tendency of depth filters toward progressive clogging over time.

The invention involves the operation of a downflow sand filter used for processing wastewater, that is, a device in which wastewater flows by gravity downwardly through sand medium. In accord with the invention, to restore or maintain flow through a sand filter, a differential air pressure is created across the bed. That causes water on or within the bed to be pushed downwardly through the bed. As the pores amongst the sand grains are dewatered, air enters the pore spaces. The flowing of air may be applied repetitiously, and in certain alternating sequences with flow of water, as detailed below. As a result diminished through-flow capacity, i.e., hydraulic conductivity, of the bed will be restored in large measure and maintained. The invention is referred to as rejuvenating in that it may be applied to a sand filter for which air has not been previously flowed. However, the method is useful as well with filters which have not yet become significantly degraded with respect to design function, to prevent them from becoming non-functional.

In one mode, air is flowed through the bed by applying pressurized air to the top of the bed, by providing an auxiliary cover for the filter, as needed. In another mode, sub-atmospheric pressure is applied to the bottom of the bed, to draw air through the bed. With either way of inducing airflow, further variations in process may be used. In one embodiment, a quantity of water is applied to the top surface of the bed after air has been flowed through the bed for a period of time. In one variation, that water quantity is sufficient to produce ponding; and in different embodiments air flow is resumed either after the pond has dissipated, or before such occurs. In another variation, wastewater flow is stopped; air is flowed for a period of time, then stopped for a period of time, then resumed again; the wastewater flow is resumed.

Preferably, the volumetric moisture content of the pores within the bed is maintained at higher than about 8%, preferably by adding plain water when needed. And, the air flow rate through the bed is preferably in the range 2-30, more preferably 3, standard cubic feet per hour per square foot of bed cross section area. Preferably, the volume of air flowed during an air portion of a rejuvenation cycle is 5 to 125 times the volume of pore space within the medium of the bed.

The foregoing and other objects, features and advantages of the present invention will become more apparent from the following description of preferred embodiments and accompanying drawings.

DETAILED DESCRIPTION

The invention is described in terms of a simple downflow depth filter which is contained within a concrete container having an underdrain and a solid bottom. The description and invention will be equally applicable to varieties of filters referred to in, or suggested by, the Background, including filters which have liners or containers; those which do not have such; those having more complex wastewater inflow distribution systems or underdrain effluent capture systems than described; those having open bottoms; those contained within surrounding soil; those rising above the surface of the soil; and those which are used in an intermittent single pass mode or in a recirculating or multipass mode. In this patent application, the term "wastewater" shall mean: the water of a community after the water has been used but prior to being treated and generally prior to the formation of biosludge in the wastewater.

For the design, construction and normal operation of filters to which the invention may be applied, reference may be made to Chapter 11 "Intermittent and Recirculating Packed Bed Filters" in R. Crites & G. Tchobanoglous, "Small and Decentralized Wastewater Management Systems," WCB/McGraw-Hill, New York (1998); and, to Chapter 11 "Advanced Wastewater Treatment" in Metcalf & Eddy, "Wastewater Engineering. Treatment and Reuse," 4th Ed. McGraw-Hill, New York (2003), the disclosures of which are hereby incorporated by reference.

Figure 1:
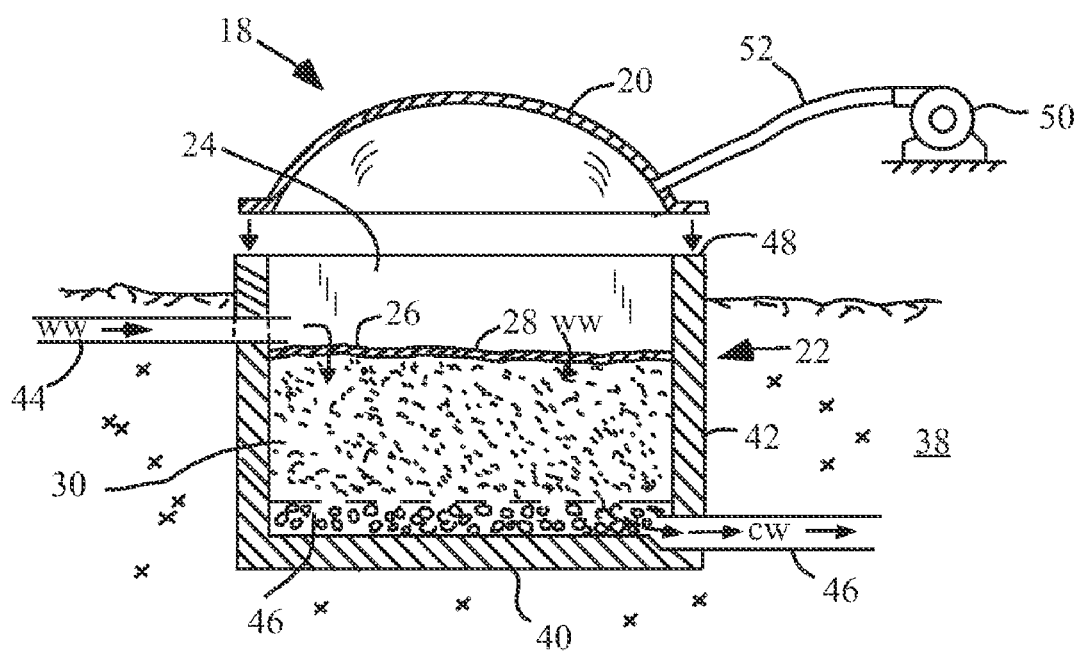
FIG. 1 shows a depth filter within a container.

FIG. 1 shows an exemplary filter system 18. Sand medium, which comprises the bed 30, partially fills container 22 to a depth of about 2-3 feet. The medium will have characteristics known in the field for depth filters. For example, as mentioned in the foregoing references, a preferred granular medium has particle size between 0.25 to 0.75 mm and a uniformity coefficient of less than 4. Other characteristics of a filter having sand medium, as distinguished from other packed bed filters, are given near the end of this description.

The container is typically rectangular or round in horizontal cross section and is partially buried in soil 38. It has a circumscribing wall 42, an open top 48, and a solid bottom 40.

The sand medium is supported on a layer 46 of coarse gravel; alternatively a grid or other open support structure may be used. Wastewater, as indicated by arrows WW, flows from a source such as a septic tank, through inlet pipe 44 and onto the top of the bed 30. The water distributes itself over the bed surface and flows downwardly by gravity through the bed, where it is treated. The treated water, indicated by arrow CW, exits the bed and flows out drain line 46. In other embodiments, known types spray systems or perforated distribution pipes may be used for the inflowing wastewater; and a system of underdrains, including optionally a plenum, may be used at the bottom of the bed.

The invention may be applied to a bed which is functioning properly, to forestall gradual degradation; or it may be applied to a bed which has degraded in performance and needs to be rejuvenated. Such degradation may be manifested by slower flow rates, prolonged ponding on the bed surface, a thick mat layer on the bed surface, or by inadequate treatment of discharged water.

In a first mode of the invention, the space above the top 26 of the bed is pressurized to make air flow through the bed 30. If a suitable cover is not already present, air-pressure containing cover 20 is placed over the top of the filter bed container 22, as indicated by the small vertical-down arrows, to thereby create a confined space 24 above the bed surface 26. The cover 20 is clamped or otherwise held in place. The cover 20 shown in FIG. 1 is dome shaped and may be made of thin rigid metal or plastic. Alternately, the top may be a flexible sheet of material.

Unless the system construction makes flow backwards up the water inflow line 44 inconsequential in the next step, wastewater inlet line 44 is blocked, to prevent such. For instance, a cap may be placed on the terminal end of line 44, inside the container. Or a valve, such as a slide or rotary (ball) valve, may be placed in the line 44, for convenience of occasional use. In another alternative, a check valve, such as a mechanical flap valve, maybe placed in the line. In still another alternative, there is a J- or S-trap water valve in the line. Such back-flow preventing means are described in U.S. Pat. No. 6,485,647, especially in connection with FIGS. 4 and 8-13. The disclosure of the patent is hereby incorporated by reference.

Space 24 under the cover 20 is then pressurized with air. For instance, air is applied to the space by means of blower 50 which is connected to the cover by a conduit 52. The air pressure is sufficient to cause air to flow downwardly through the mat and into and through the sand bed 30. Air flows from the bottom of the bed, through the gravel and travels to exit line 46, as normally does treated wastewater. Where the air travels next varies with the construction of the sand filter. For example, if the filter has no underdrain, or if the discharge line runs to a leaching system which percolates treated water into the soil, then the air can diffuse through soil. Or, if the discharge line is vented to atmosphere, the process air can flow up the vent. A blower 50 or other air mover having pressure and volume characteristics sufficient for the purpose is used. Usually, the blower is characterized as a high pressure blower of the regenerative or centrifugal type, and will be capable of producing from 40 to 120 inch water column pressure, according to whatever is necessary to push air through the bed with volumes of the kind indicated below.

Any ponded water originally on the surface of the bed will be forced downwardly into the bed. Any water within the pore spaces of the bed will substantially be pushed downwardly also. The ponded and pore waters will flow out the bottom of the bed. The pressurized airflow is maintained for time sufficient to push water from the bed and to then flow further air through the bed. Then wastewater may be dosed onto the bed, and preferably the cycle is repeated over and over, in accord with the different embodiments described below. Conventional thinking is that treatment depends on long residence time of water in the bed; thus, forcing water downwardly would seem to be not good. Notwithstanding, good treatment of subsequently dosed water occurs with repeated air cycles, and whenever rejuvenation is ceased and conventional operation is resumed.

Figure 2:
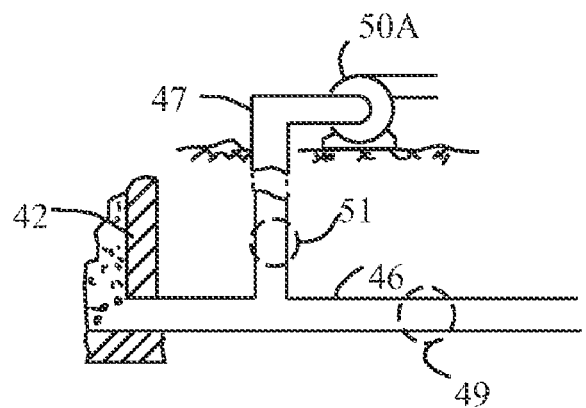
FIG. 2 is a detail of an alternative embodiment of depth filter.

In another embodiment of the invention, a cover is not used, and the space 24 above the bed is open or vented to atmosphere. Sub-atmospheric pressure is applied to the bottom of the bed, thus pulling atmospheric air and water in and above the bed downwardly. With reference to FIG. 1, a blower or some other air mover capable of evacuation is connected so that the space within gravel 46 beneath the bed is partially evacuated. The air mover creates a pressure differential across the bed commensurate with that described above for the pressurized mode. As shown in FIG. 2, blower 50A may be connected to the line 47, which is connected to drain line 46. If there is no drain line 46, then line 47 may be connected to the space where the gravel is. Optionally, there a perforated pipe array may be buried within the gravel. If air flow upstream along the drain line (I.e., in direction opposite to the normal treated wastewater flow) is likely, suitable valving or trapping 49, schematically suggested in FIG. 2, may be installed, to prevent flow of water, air or other fluid, up the line 46 from its discharge location. It will be similar to that previously described for use in the inlet line 44. As necessary, a centrifugal separator 51 or other water trap may intercept any water which is drawn toward the blower inlet, as also schematically shown in FIG. 2. Advantages of this mode include that the top need not be sealed, and that no check valve is needed to prevent pressurized air from flowing backwards, up the wastewater line 44, and that there can be continuing gravity flow of wastewater into the filter bed by means of line 44.

The air which flows through any mat 28 on the top surface 26 of the bed 30, and then through the rest of the bed, will desirably dewater the bed of water by urging it better in the direction in which gravity pulls. Water within pore spaces of the medium will be significantly replaced by air or such other gas as may be used. That will induce aerobic microbiological and other aerobic action within the mat and within the pores of the bed. Accumulated organic material within the bed and the mat may substantially disappear. The hydraulic conductivity of the bed will increase and the bed will be rejuvenated as a result of the invention process. Or, when the invention is used with an adequately functioning filter, progressive degradation can be avoided. However, obviously, the air flow will not cause unsoluble and unreactive solids, e.g., oxide particles, to be removed. If desired, the invention may be used with periodic backwashing or other cleaning processes of the prior art.

In either pressurized or partial vacuum mode, air flow through the filter bed is sustained sufficiently long to achieve the desired result of increasing water flow capacity of the bed. The air flow rate that is desirable may vary considerably. As an example, preferred airflow will be in the range 2-40 cubic feet per hour per square foot of bed surface area. More preferably, flow rate will be in the range 8-20, most preferably 12-14 cubic feet per hour per square foot. In a preferred embodiment, the nominal velocity of airflow through the bed is 2-10 feet/hr.

In preferred use of the invention, the filter is removed from ordinary service so that air and water flow may be alternated, as detailed further below. However, when ordinary use of the filter must be sustained, the invention may be interwoven with such operation. For example, where as is common, wastewater is dosed onto the surface, the invention air is flowed between doses. Optionally, air flow may be continued during time when water is being dosed.

As air is flowed through the bed, there should be periodic application of water to the bed, as necessary to keep moisture (water) content of the medium above 3%, preferably more than 8%, more preferably 12%, where the percentage refers to the volume of water as a fraction of the volume of the pore spaces within an average portion of the bed. The extent to which the bed dries will depend on initial conditions and the water content of the air flowing through the bed. Moisture content will preferably be monitored by means of sensors. When needed, water may be flowed onto the top of the bed as a dose, or entrained with the air as a fine mist or vapor, with the air, or by a dose of wastewater. Preferably, plain water or heavily diluted wastewater will be added to the bed when moisture is required, in preference to normal strength wastewater, since that will encourage microbes to seek energy source within the bed by consuming accumulated biomass.

In a preferred practice of the invention, on a per-square-foot of bed surface area basis, air is preferably flowed at about 2-10, preferably about 3, standard cubic feet per hour for periods of 1 to 5 hours. Preferably, in an air dose cycle, about 2 to 50 cubic feet of air are passed through a one foot unit volume of medium having a one square foot cross sectional area. Typically, sand will have about 40% porosity, which is the same as saying "it has about 0.4 cubic feet of pore space per cubic foot. The volume of air flow is preferably 5 to 125 times the volume of the pore space in the unit volume bed. That relationship may be characterized as being the number of times the air in the pores of the bed has been exchanged. Preferably, the volume of air flowed into the bed for an air dose will be at least 3 to 10 times the actual or calculated pore volume of the medium in the bed.

If a bed is being rejuvenated so it can later be used as originally intended, without air augmentation of the type described here, then the invention processed may be sustained for a prolonged period of time. The duration of treatment can be based on prior experience with the bed or related beds, or on a measurement of the effectiveness of treatment, as such maybe gauged by measuring the oxygen content within the bed or the change in pressure drop across the bed. Energy consumption by the blower and any time for which the filter bed is off-line are factors that are taken into consideration to limit flow time.

There other useful variations in practice of the invention, applicable to either pressure or partial vacuum methods, as indicated by the following examples.

In a first variation, the bed is left quiescent for a time, for example at least 10 minutes, preferably about 30 minutes. Then, air flow is either resumed for another period of time, or a dose of water is applied. For example, wastewater flow is ceased, air is flowed for about an hour, then there is no flow of air or water for about an hour, then air flow is resumed for an hour, then a dose of wastewater is applied. Such an on-off air cycle in alternation with water dose may be repeated one or more times during a rejuvenation process, prior to resuming regular operation and wastewater flow.

In a second variation, air flows for a period of time, for example 0.5 to 1 hour. Then air flow is ceased and a dose of wastewater or plain water is flowed onto the surface of the bed, at a rate sufficient to cause the water to pond on the surface of the bed. That is, the water dosing rate is greater than the water flow rate which the bed currently has. Ponding is evident when a continuous layer of water accumulates, and will be evident by refraction or reflection of light or by means of a suitable sensor. To create a pond usually takes only a matter of minutes.

Once the pond is created, one of two alternatives may be followed. In the first, the pond is allowed to dissipate, and then air flow is re-started, either immediately or after waiting a number of minutes. The resumed air flow is sustained for 30 to 60 minutes, depending on factors previously mentioned, including the condition of the air being flowed through the bed. In the second alternative, the pond is forced to dissipate by air flow. The applied differential air pressure forces flow of the ponded water into and through the bed, eliminating the ponding more quickly than otherwise. Then the air flow is ceased, and the cycle is repeated by flowing water sufficient to create a new pond. In limited experiments, the variations provide for subsequent good operation of a clogged filter bed, before further clogging becomes evident. The reasons for the advantage of either are not well understood, but one advantage might be that they better ensure continued moistness of any mat and upper part of the bed, where there is usually found a lot of organic matter. In absence of the processes, those regions might dry out preferentially, compared to the rest of the bed, under sustained airflow.

Atmospheric air is the preferred gas to flow through the bed. Another gas, such as oxygen or ozone may be added to the air flow by introducing it with the air, above the bed, to accelerate desired biochemical effects.

In the generality of the invention, the method may be applied in combination with raking or partial replacement of the medium or the bed. The invention is applicable to sand beds. Sand beds, as distinguished from other packed beds, will have certain water through-flow and water retention characteristics, as follows. For an exemplary sand: (1) Saturated hydraulic conductivity, $K_{SAT}$, is between about 1000-4000 ft/day; or (2) When the medium is saturated and then gravity drained, the then-moist medium will comprise at least about 5% by volume water, preferably at least about 10%, more preferably at least about 20%. The medium may be further characterized as discharging more water, when air is flowed through drained medium; or (3) After thorough dosing/wetting, followed by draining for one hour, with airflow downward at the rate of 10-20 scfb/ft2 the bed will exhibit an average pressure gradient in the range of 0.5 and 4 inch water column per inch of bed depth.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed:

1. In the method of rejuvenating or maintaining the operation of a downflow sand filter used for processing wastewater, wherein water delivered to the top of a sand bed flows by gravity through the bed, the improvement which comprises: (a) ceasing the flow of wastewater, where wastewater is the water of a community after the water has been used but prior to being treated and generally prior to the formation of biosludge in the wastewater, onto the top of the bed; (b) flowing air downwardly through the bed, while the wastewater flow is ceased, to thereby at least in part dewater the bed and to introduce air into the pore spaces of the bed; and (c) resuming the flow of wastewater.

2. The method of claim 1 bed wherein air is flowed through the bed by applying higher than atmospheric pressure to the top of the bed.

3. The method of claim 2 wherein the water is delivered to the top of the sand bed by means of an inlet pipe, further comprising: preventing the flow of pressurized air up inlet line in the direction opposite to the direction in which wastewater flows.

4. The method of claim 2 wherein the filter is of a type which has an open top, further comprising: placing a cover on top of the bed to create a space above the bed which can be pressurized with air.

5. The method of claim 1 wherein air is flowed through the bed by applying sub-atmospheric pressure to the bottom side of the bed.

6. The method of claim 5 wherein sand filter has an underdrain beneath the bed wherein the sub-atmospheric pressure is applied by connecting an air mover to the underdrain.

7. The method of claim 6 further comprising: preventing flow of fluid up the drain line from its discharge location during step (b).

8. The method of claim 1 wherein the air flow is in the range of 2-30 standard cubic feet per hour per square foot of bed cross section surface area.

9. The method of claim 1 wherein the volume of air flowed during step (b) is 5 to 125 times the volume of pore space within the medium of the bed.

10. The method of claim 1 which further comprises: periodically introducing water sufficient to prevent the bed from drying out due to the effects of air flow, so that microbiological activity is maintained.

11. The method of claim 10 wherein during step (b) the volumetric moisture content of the pores of the bed is maintained at 8% or more.

12. The method of claim 1 wherein steps (a), (b) and (c) are serially repeated a multiplicity of times.

13. The method of claim 1 wherein step (b) is divided into two portions, a first portion wherein air is flowed, and a second portion where the bed is allowed to remain quiescent for at least 30 minutes.

14. The method of claim 1 which further comprises carrying out the following steps between steps (b) and (c):
(i) applying wastewater at a rate sufficient to create a pond on the top of the filter bed;
(ii) ceasing the flow of wastewater;
(iii) waiting for the pond to dissipate; then,
(iv) resuming the flow of air for a period of time; then, (v) ceasing the flow of air; and then, (vi) resuming flow of wastewater.

15. The method of claim 14 wherein step (iii) is omitted and the step (iv) air flow is resumed while ponded water is still present on the surface of the bed.

16. The method of claim 1, where in step (b), the flowing of air is done for a period of time, and the flowing of air is ceased for a period of time.

17. The method of claim 1, where in step (c), air is flowing during the resuming the flow of wastewater.

18. In the method of rejuvenating or maintaining the operation of a downflow sand filter used for processing wastewater, wherein wastewater delivered to the top of a sand bed flows by gravity through the bed, the improvement which comprises: (a) flowing air downwardly through the bed; (b) ceasing the flow of wastewater onto the top of the bed for a period of time, while continuing the flow of air, to thereby enable the air to at least in part dewater the bed and to enable air to be introduced into the pore spaces of the bed, where wastewater is the water of a community after the water has been used but prior to being treated and generally prior to the formation of bio-sludge in the wastewater; and (c) resuming the flow of wastewater with or without continuing the flow of air.

* * * * *